Figure 1:
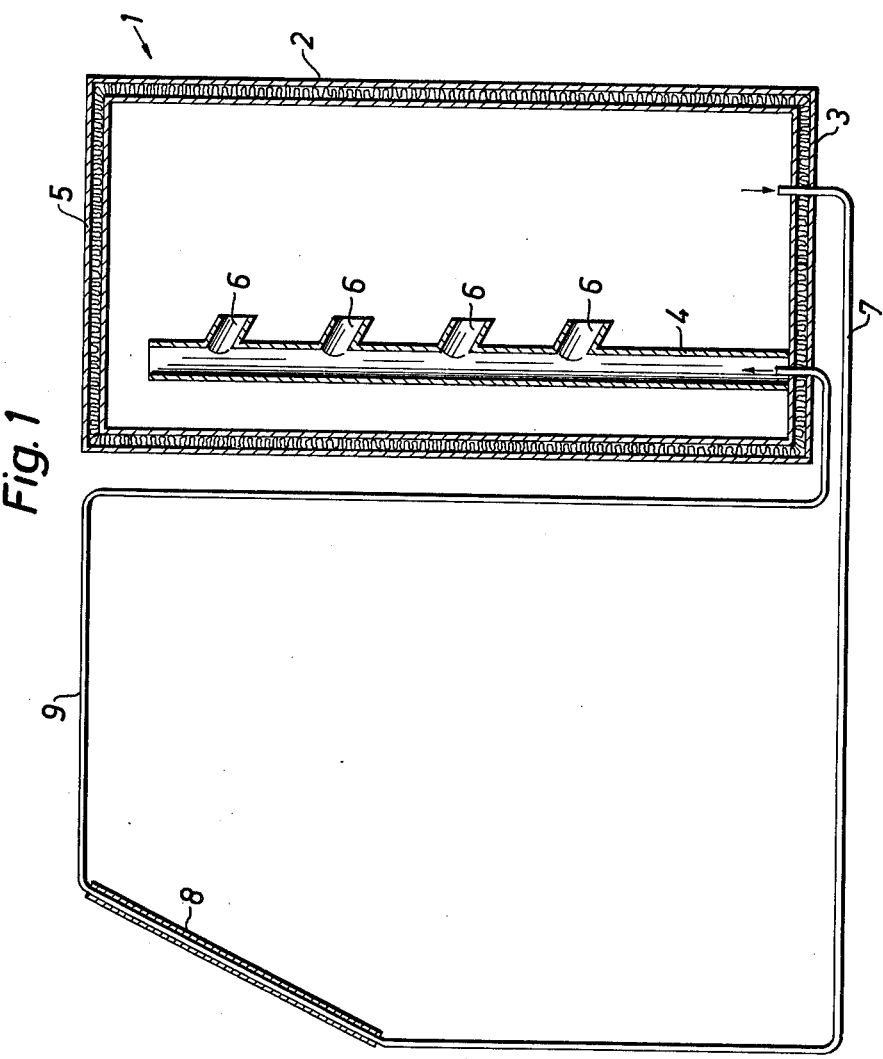

United States Patent [19]

Johansson

[11] 4,146,087
[45] Mar. 27, 1979

[54] DEVICE FOR ACCUMULATION TANKS FOR FLUID

[75] Inventor: Axel H. Johansson, Arlov, Sweden

[73] Assignee: Automatik-Värme-Ventilationsservice AVV AB, Malmö, Sweden

[21] Appl. No.: 849,624

[22] Filed: Nov. 8, 1977

[30] Foreign Application Priority Data

Nov. 12, 1976 [SE] Sweden .................. 7612682

[51] Int. Cl.² .................. F28D 15/00
[52] U.S. Cl. .................. 165/104 S; 126/271; 126/400; 137/564
[58] Field of Search .................. 126/400, 271; 165/104 S, 106; 137/564; 237/1 A

[56] References Cited

U.S. PATENT DOCUMENTS 2,233,505  3/1941  Amundsen .................. 137/564 X

Primary Examiner—Edgar W. Geoghegan
Attorney, Agent, or Firm—Witherspoon, Lane & Hargest

[57] ABSTRACT

Method and device for maintaining and reinforcing in an accumulation tank a stratified condition of fluid caused by the fluid in the tank when a flowing of the fluid is caused by heating the same. The portion of the fluid in the tank that is to be heated is separated from the fluid in the tank prior to the heating and the heated fluid is permitted to ascend through a liquid column separated from the fluid in the tank and is conducted back into the tank at the fluid-layer that has substantially the same temperature as the heated fluid. The device comprises an accumulation tank in which a tube is arranged substantially vertically from the bottom thereof towards its upper part and the tube receives separated heated fluid which is allowed to ascend through the tube. The tube is provided with openings one after the other along the tube constituting outlets for the heated fluid.

6 Claims, 4 Drawing Figures

DEVICE FOR ACCUMULATION TANKS FOR FLUID

The present invention relates generally to accumulation tanks for fluid, and more particularly to a device for such tanks for stratified accumulation of fluid, where the stratification is determined by the varying temperatures in the accumulated fluid.

Accumulation tanks of the kind to which the present invention relates are primarily intended for storing heated water in house heating, which water in turn is used for the actual heating of houses, e.g. with common water radiators, and for heating household water. Such accumulation tanks are primarily meant for storing heat energy, which is obtained intermittently and/or with varying intensity and which can be withdrawn rather uniformly.

The range of application of the invention is, however, not limited to heating but can successfully be extended to include other areas, e.g. within the process industry where there is a demand for temperature-stratified fluid-storing.

There is presently a desire that solar energy should be usable for heating purposes in combination with other sources of energy. However, solar energy is provided intermittently as well as with varying intensity, whereby the intermittent provision to the greatest extent is dependent upon the periodic alternation of day and night, while the varying intensity to the greatest extent is dependent upon the relationship between sunny and cloudy weather.

Heretofore all of the supplied energy has been taken up in the form of heated fluid, whereby the fluid itself or another material, e.g. sand or rock, has constituted the storing material. As long as the solar energy has given a higher fluid temperature than the temperature in the storing material this energy has been assimilated while the system has been shut off if the solar energy has not given such a temperature.

To improve the heat exchange by the heat transfer from the solar heating system to the fluid in an accumulation tank it has recently become more and more common to use so called heat pumps. No effort has, however, been made in constructing the accumulation tank, and this has simply represented a fluid reservoir in which the fluid has been free to circulate. The withdrawal of heat from the fluid in the tank has taken place at the top of the tank, either through heat exchange or through a direct withdrawal of fluid, and this has resulted in that the fluid in the tank has been caused to circulate and in that the difference in temperature between the upper part of the tank and its bottom has been relatively small. The fact that the heated fluid has been fed directly to the tank or has been in a heat interchanging relationship with the fluid in the tank at the lower part of the tank contributes to the circulation in the tank. It has been desired to obtain as high a temperature as possible in the hot water that is withdrawn from the tank for use as household water or for heating purposes. Preferably the temperature of this water must not fall below 50° C but this has earlier not been possible to achieve as the mixing in the tank has lowered the temperature of the fluid or water in the tank, which has possibly been heated to a high temperature, during its rising in the tank. To remedy this it has been common to supply additional heat, e.g. by means of an electrical cartridge heater. However, it is advantageous to obtain hot water with a temperature preferably above 50° C without such an arrangement of additional heat. For heating purposes it is also advantageous if it is possible to withdraw fluid of a relatively high temperature.

The present invention is intended to eliminate the drawbacks of the prior art system and to obtain the objects and advantages mentioned above. This is accomplished with a device according to the claims.

Figure 2:
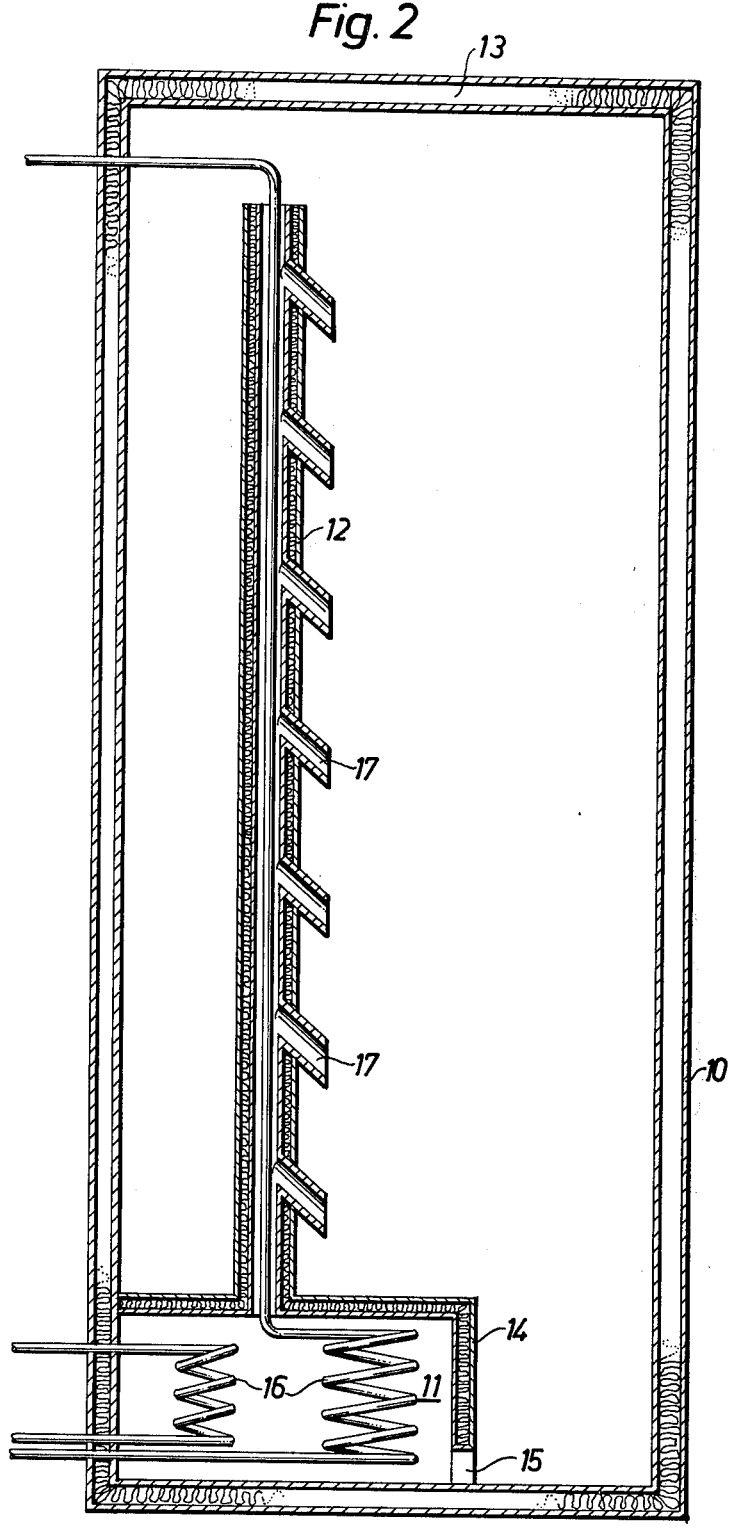
Figure 4:
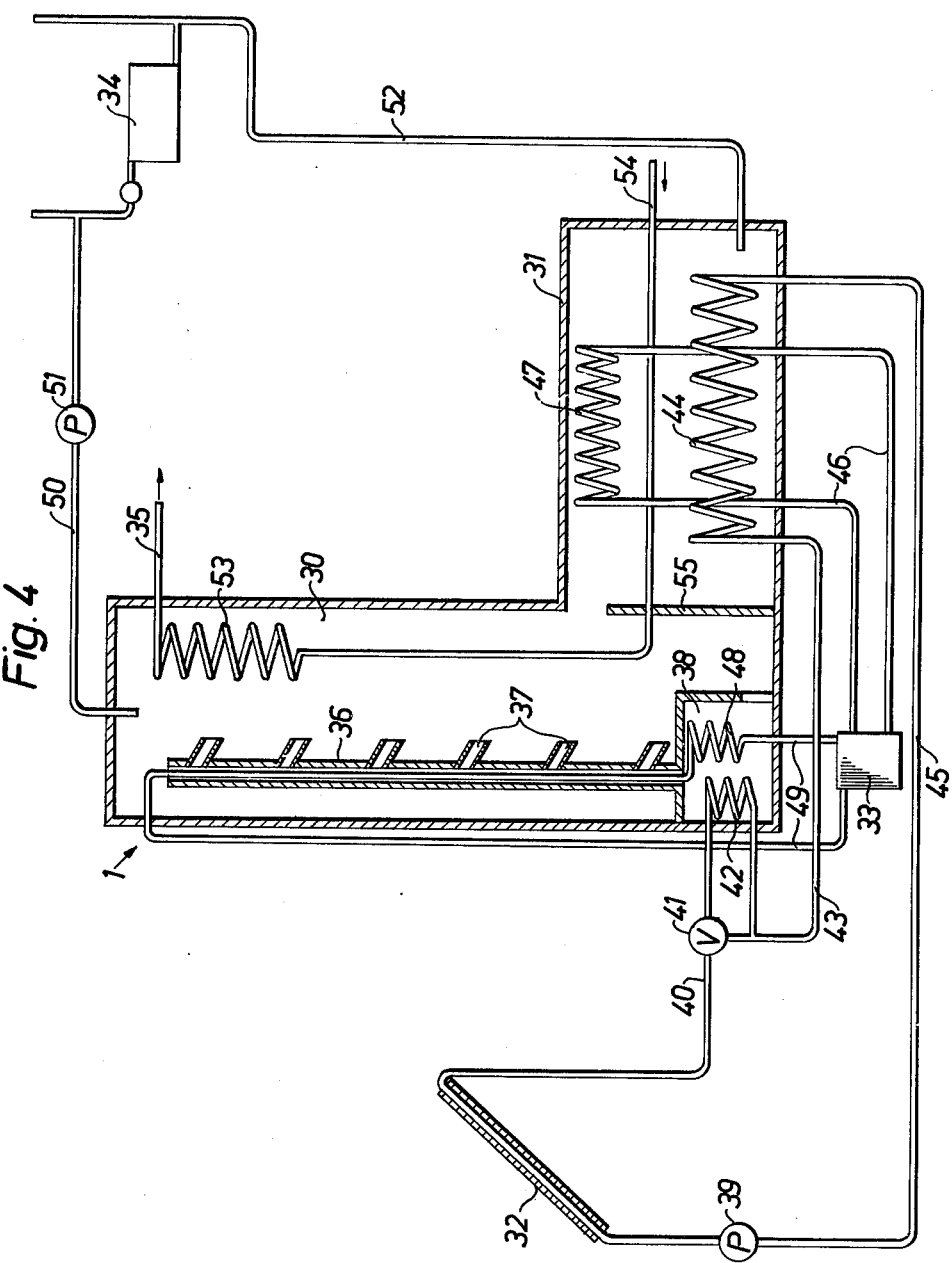

The invention is described more in detail below, with reference to the enclosed drawings, of which, FIG. 1 is a schematic illustration of the accumulation tank according to the present invention in combination with a solar energy collector, FIG. 2 is a schematic section through an embodiment of the accumulation tank according to the invention, FIG. 3 is a fragmentary illustration of a section of a preferred embodiment of the discharge nozzles used in the accumulation tank according to the invention, and FIG. 4 is a schematic illustration of a solar heating system for househeating, where the accumulation tank according to the invention is included.

The accumulation tank 1 in FIG. 1 consists of an impervious heat-insulated container 2, from the bottom 3 of which a tube 4 extends upwardly and terminates adjacent to the cover 5 of the tank 1. The tube 4 is provided with openings 6 which are arranged one after the other and is open at the upper end. A pipe 7 extends from the bottom 3 of the container 2 to a solar energy collector 8 and a pipe 9 extends from the solar energy collector 8 back to the container 2 and has its orifice at the lower end of the tube 4.

A circulation pump is preferably inserted in either of the pipes 7 or 9, but in principle the system also works due to so called thermosiphon circulation in which case no circulation pump is needed.

In the accumulation tank 1 there are furthermore provided outlets for heated fluid which are not shown in FIG. 1. The system illustrated in FIG. 1 preferably contains a so called anti-freezing fluid, as there is otherwise a danger of bursting due to frost during winter, and in this case the withdrawal of the heat energy stored in the accumulation tank 1 is accomplished by means of heat exchangers. The system is preferably filled with fluid except for a small air-cushion, which is necessary for allowing the fluid to expand in relation to its heating.

In the solar energy collector 8 the fluid that flows from the bottom of the tank 2 through the pipe 7 is heated and the heated fluid flows into the lower end of the tube 4. It is not necessary that the tube 4 fits tightly against the bottom 3 but the heated fluid should be led into the tube 4 and should not be allowed to flow up around the outer side of the tube 4.

The accumulation tank should have a relatively large volume so that the fluid flow from the tank to the solar energy collector and back does not cause any noticable turbulence in the fluid in the tank.

The tube 4 constitutes an ascending pipe through which the heated incoming fluid ascends to the same extent that a corresponding quantity of fluid flows out through the pipe 7. The tube 4 is provided with openings 6 uniformly spaced along its length. The heated fluid ascends in the tube to the level of the opening where the temperature of the fluid in the tank 1 substantially corresponds to the temperature of the ascending fluid, and there the fluid flows out through the opening.

This means that the warmer the fluid is that flows in through the pipe 9 the higher it ascends in the tube 4 before it flows out through the proper opening 6. If cooler fluid enters it does not ascend to the same level and the result is that the fluid-layer above this cooler fluid-layer is not at all affected by the fluid that enters through the tube 4. Thus it has become evident that a fixed stratification is maintained in the accumulation tank by a device as presently described, and that this stratification is dependent upon the temperature differences in the fluid, in which the upper layer is the warmest.

The accumulation tank illustrated in FIG. 2 consists of a heat-insulated container 10, which at the bottom has a chamber 11 from which an ascending pipe 12 extends upwardly towards the cover 13 of the container 10. The wall 14 of the chamber 11 as well as the pipe 12 are heat-insulated. The chamber 11 is in communication with the rest of the interior of the tank through an opening 15.

In the chamber 11 there are two heat-exchanger loops 16, of which one may be part of a circuit provided with a solar energy collector, and the other may be part of a circuit for a heat pump. In this system the fluid from the heating-circuits is insulated from the fluid in the container 10, which means that the fluid in the container may be used directly in e.g. heating-or hot water-systems. The container is naturally provided with discharges (not shown) for the heated fluid and may also comprise heat exchangers for the withdrawal of thermal energy.

The circulation in the container 10 goes on in substantially the same quiet way as in the container 2 in FIG. 1. The fluid in the chamber 11 is heated through heat exchange at the loops 16 and ascends through the tube 12 to the level where the temperature of fluid in the container 10 is substantially the same as the temperature of the ascending fluid, and flows out through the proper opening 17 in the tube 12. At the same time fluid flows into the chamber 11 through the opening 15.

In principle the openings in the ascending pipe may simply consist of a hole in the tube wall. However, FIG. 3 illustrates a preferred embodiment of these openings where they are formed as small nozzles 20 which give the fluid that flows out of these nozzles a slightly directed movement that preferably coincides with the rounded configuration of the container. It has appeared that such a movement of the outflowing fluid causes less turbulence than a flow directed straight outwardly.

FIG. 4 of the drawings shows the principles for a heating system for houses in which an accumulation tank according to the present invention is included. The accumulation tank 1 consists of a vertical section 30 and a horizontal section 31, whereby the horizontal section constitutes an additional storing section of the tank 1. In connection with the tank 1 there is provided a solar energy collector 32 and a heat pump 33, and outlets to a heating system indicated by a water radiator 34 and a hot-water system 35.

An ascending pipe 36 rises through the vertical section 30 of the tank 1, and is provided with openings 37, in the same manner as in the above described embodiments. The ascending pipe 37 extends from a chamber 38 at the bottom of the tank 1.

A vertical wall 55 extends from the bottom of the tank and terminates just under the horizontal part 31 of the cover of the tank. This wall 55 prevents the cold fluid in the lower part of the horizontal section 31 of the tank from entering into the lower part of the vertical section 30 of the tank. Since the heat pump 33 draws heat from the fluid in the horizontal section 31 of the tank, the fluid in this section has a relativley low temperature, which is advantageous when it concerns a fluid that shall be supplied to the solar energy collector 32 for heating, but is on the other hand disadvantageous if this cooled fluid should enter into the vertical section 30 of the tank where the object is to keep the temperature as high as possible.

It is also possible to have the two sections of the tank completely separated from each other as two separate units, which are interconnected by pipes. This would hardly give any functional advantages but might on the other hand simplify the installing of the set up.

The circulation system in connection with the solar energy collector 32 is closed so that it may contain anti-freeze fluid and also includes a circulation pump 39. The fluid is heated in the solar energy collector 32 and is conducted through a pipe 40 and through a change-over valve 41 to a heat-exchanger cell 44 in the horizontal storing section 31 of the tank. From the heat-exchanger cell 44 the fluid is then conducted back to the solar energy collector 32 through a pipe 45, in which the circulation pump 39 is arranged. If the fluid from the solar energy collector 32 has a relatively low temperature the valve 41 is preferably adjusted so that the fluid passes by the heat-exchanger cell 42 in the chamber 38 and is conducted directly through the heat-exchanger cell 44 since the fluid, if its temperature is not sufficiently high, will counteract the heating accomplished through the system that is provided with the heat pump 33.

The heat pump 33 is thus provided with a loop 46 which leads to a heat exchanger cell 47 at the upper part of the horizontal storing section 31 of the tank. The heat pump 33 absorbs heat from the fluid in the storing section 31 of the tank through this heat exchanger cell 47 and emits this heat through a heat exchanger cell 48, which is inserted in a pipe-loop 49 from the heat exchanger 33, in the chamber 38.

It is true that the temperature of the fluid in the storing section 31 is lowered through this arrangement but the temperature of the fluid in the vertical section 30 of the tank is raised and it is desired to keep the temperature as high as possible in that section.

As illustrated the fluid in the tank may be used directly for heating purposes. A pipe 50 extends from the upper part of the tank 1 and a circulation pump 51 inserted in this pipe pumps the hot fluid through radiators and the like, which is marked by the radiator 34. The return fluid then flows through a pipe 52 back to the storing tank 31.

The reference number 35 marks a pipe from a heat exchanger 53 for the heating of household hot-water, whereby cold water is supplied to this heat exchanger through pipe 54. The pipe 54 passes through the storing section 31 for pre-heating of the water before it reaches the heat exchanger 53, which is positioned in the upper part of the vertical section 30 of the tank, where the fluid in the tank has its highest temperature.

The system may comprise various valves and temperature sensors for automatic change-over and best possible exchange of heat. There may also be additional heating arrangements that are connected when need arises, e.g. electrical cartridge heaters or oil-driven heating arrangements. Such measures are however evident for anyone skilled in the art and will not be discussed further in this connection.

Through the invention it is achieved that the fluid in the tank is kept well stratified dependent upon its temperature, in spite of the fact that thermal energy is continuously withdrawn and supplied, which has previously resulted in a levelling out of the temperature of the fluid to a substantially equal temperature of the fluid in the upper part of the tank and the fluid at the bottom of the same. With the present invention it has thus become possible to withdraw even comparatively hot water for household use, which has previously been difficult to accomplish without special measures.

I claim:

1. A method for maintaining and reinforcing, in an accumulation tank, a stratified condition of fluid caused by the fluid in the tank, when a flowing of the fluid is caused by heating the same, characterized in that the portion of the fluid in the tank that is to be heated is separated from the fluid in the tank prior to said heating, and that the heated fluid is permitted to ascend through a liquid column separated from the fluid in the tank, and that the fluid is conducted back into the tank at the fluid-layer that has substantially the same temperature as the heated fluid.

2. Device for performing the method of claim 1, comprising an accumulation tank (1) containing fluid, characterized by a tube (4, 12, 36) arranged substantially vertically, and extending substantially vertically in the tank from the bottom of said tank towards its upper part and the lower end of which receives separated, heated fluid which is allowed to ascend through the tube, whereby the tube (4, 12, 36) is provided with openings (6,17,37) positioned one after the other along the tube.

3. Device according to claim 2, characterized in that the tube (4, 12,36) extends from a chamber (11,38) at the bottom of the tank, and that this chamber (11,38) is in communication with the fluid in the tank, and that this chamber (11,38) contains separated, heated fluid that is to ascend through the tube (4,12,36).

4. Device according to claim 3, characterized in that said chamber (11,38) is provided with heat exchangers (16) for heating of the fluid that is separated in the chamber.

5. Device according to claim 3, characterized in that the tube (4,12,36) has a low thermal conductivity.

6. Device according to claim 5, characterized in that the openings in the tube (4,12,36) are constituted of tubular nozzles (20).

* * * * *